(12) United States Patent
Hawawini et al.

(10) Patent No.: US 12,484,009 B2
(45) Date of Patent: Nov. 25, 2025

(54) LOCATION DETERMINATION IN DISTRIBUTED SYSTEM

(71) Applicant: Qorvo US, Inc., Greensboro, NC (US)

(72) Inventors: Shadi Hawawini, Mountain View, CA (US); Tim Allemeersch, Affligem (BE); Alexis Bizalion, San Francisco, CA (US); Julien Colafrancesco, Issy-les-Moulineaux (FR)

(73) Assignee: Qorvo US, Inc., Greensboro, NC (US)

( * ) Notice: Subject to any disclaimer, the term of this patent is extended or adjusted under 35 U.S.C. 154(b) by 412 days.

(21) Appl. No.: 18/136,601

(22) Filed: Apr. 19, 2023

(65) Prior Publication Data

US 2023/0379862 A1 Nov. 23, 2023

Related U.S. Application Data

(60) Provisional application No. 63/364,981, filed on May 19, 2022.

(51) Int. Cl.
*H04W 64/00* (2009.01)
*G01S 5/02* (2010.01)

(52) U.S. Cl.
CPC ........... *H04W 64/00* (2013.01); *G01S 5/0273* (2013.01); *G01S 5/0289* (2013.01); *G01S 2205/02* (2020.05)

(58) Field of Classification Search
CPC .... H04W 64/00; G01S 5/0273; G01S 5/0289; G01S 2205/02; G01S 5/12

(Continued)

(56) References Cited

U.S. PATENT DOCUMENTS

| | | | |
|---|---|---|---|
| 11,768,266 B2 * | 9/2023 | Wang | G01S 3/46 |
| | | | 342/444 |
| 2004/0102196 A1 * | 5/2004 | Weckstrom | H04W 64/00 |
| | | | 455/456.2 |

(Continued)

FOREIGN PATENT DOCUMENTS

| | | | | |
|---|---|---|---|---|
| KR | 20190002669 A | * | 1/2019 | H04W 74/0808 |
| WO | WO-2013108043 A2 | * | 7/2013 | G01S 5/0249 |

(Continued)

OTHER PUBLICATIONS

Extended European Search Report for European Patent Application No. 23171641.6, mailed Oct. 23, 2023, 8 pages.

*Primary Examiner* — Mahendra R Patel
(74) *Attorney, Agent, or Firm* — Withrow & Terranova, P.L.L.C.

(57) ABSTRACT

Systems and method for location determination in a distributed system are disclosed. In one aspect, the distributed system operates at frequencies where obstacles and distance may preclude direct connection between a system node and a remote mobile device. The system may determine the location of the remote mobile device using an intermediate device and thus be a location system. Specifically, a position of the intermediate device relative to the system node is calculated and a position of the remote mobile device relative to the intermediate device is calculated. The two positions may be combined to determine a position of the remote mobile device relative to the system node. Once the location of the remote mobile device is known relative to the system node, a variety of location services become available.

17 Claims, 5 Drawing Sheets

(58) Field of Classification Search
USPC .......................................... 455/456.1
See application file for complete search history.

(56) References Cited

U.S. PATENT DOCUMENTS

| | | | | |
|---|---|---|---|---|
| 2013/0029686 | A1* | 1/2013 | Moshfeghi | H04W 4/021 |
| | | | | 455/456.1 |
| 2015/0057030 | A1* | 2/2015 | Rosenbaum | G01S 13/878 |
| | | | | 455/456.5 |
| 2016/0073372 | A1* | 3/2016 | Sen | G01S 5/12 |
| | | | | 455/456.2 |
| 2016/0095080 | A1* | 3/2016 | Khoryaev | G01S 5/0284 |
| | | | | 455/456.1 |
| 2016/0183053 | A1* | 6/2016 | Bao | H04W 4/023 |
| | | | | 455/456.1 |
| 2016/0374045 | A1* | 12/2016 | Pandharipande | G01S 5/18 |
| 2017/0221341 | A1* | 8/2017 | Pai | H04W 4/80 |
| 2018/0020421 | A1* | 1/2018 | Kumar | H04W 4/33 |
| 2019/0075540 | A1* | 3/2019 | Liou | G01S 5/0036 |
| 2020/0319289 | A1* | 10/2020 | Borsos | G01S 5/06 |

FOREIGN PATENT DOCUMENTS

| | | | | |
|---|---|---|---|---|
| WO | WO-2016048509 A1 * | 3/2016 | ............ | H04W 64/00 |
| WO | WO-2017051062 A1 * | 3/2017 | ............. | H04W 4/02 |
| WO | WO-2022234294 A1 * | 11/2022 | ............... | G01S 5/14 |

* cited by examiner

LOCATION DETERMINATION IN DISTRIBUTED SYSTEM

PRIORITY CLAIM

The present application claims priority to U.S. Provisional Patent Application Ser. No. 63/364,981 filed on May 19, 2022, and entitled "LOCATION DETERMINATION IN DISTRIBUTED SYSTEM," the contents of which are incorporated herein by reference in its entirety.

BACKGROUND

I. Field of the Disclosure

The technology of the disclosure relates generally to locating devices in a distributed communication system, and particularly to a wireless mesh system with limited range.

II. Background

The ability to provide location-based services for mobile computing devices has spawned entire industries with content providers trying to use such services to push content to end users and end users trying to use such services to navigate to a desired location. Additionally, emergency services such as E911 rely on location-based services to route emergency providers to locations associated with mobile devices. Still other systems may use location-based services for tracking the location of inventory or the like. Early systems relied on trilateration using robust cellular or other wireless signals (e.g., BLUETOOTH, WIFI, ultra-wideband (UWB), or the like) or self-reporting from a mobile computing device equipped with a Global Positioning System (GPS) (or equivalent) receiver. However, wireless standards are evolving and using higher frequency signals, which are less capable of penetrating walls or other physical barriers, which in turn may limit an effective range of location systems based on such new standards. Accordingly, there is room for innovation for such location systems.

SUMMARY

Aspects disclosed in the detailed description include systems and methods for location determination in a distributed system. In an exemplary aspect, the distributed system operates at frequencies where obstacles and distance may preclude a direct connection between a system node and a remote mobile device. The system may determine the location of the remote mobile device using an intermediate device. Specifically, a position of the intermediate device relative to the system node is calculated, and a position of the remote mobile device relative to the intermediate device is calculated. The two positions may be combined to determine a position of the remote mobile device relative to the system node. Once the location of the remote mobile device is known relative to the system node, a variety of location-based services becomes available.

In this regard in one aspect, a method of locating a remote mobile device is disclosed. The method comprises receiving first location information about an intermediate mobile device relative to an anchor unit. The method also comprises receiving second location information about a remote mobile device relative to the intermediate mobile device. The method also comprises calculating an absolute position of the remote mobile device based on the first location information and the second location information.

In another aspect, a location system is disclosed. The location system comprises an anchor unit with a fixed first location. The location system also comprises a remote mobile device configured to operate outside a range of the anchor unit. The location system also comprises an intermediate mobile device configured to provide first relative position information relating to the remote mobile device to the anchor unit and determine second relative position information relating to the anchor unit. The first relative position information and the second relative position information may be used to determine a position of the remote mobile device relative to the anchor unit.

In another aspect, a method of locating a remote mobile device is disclosed. The method comprises receiving first location information about an intermediate device relative to an anchor unit. The method also comprises receiving second location information about a remote mobile device relative to the intermediate device. The method also comprises calculating an absolute position of the remote mobile device based on the first location information and the second location information.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include systems and methods for location determination in a distributed system. In an exemplary aspect, the distributed system operates at frequencies where obstacles and distance may preclude a direct connection between a system node and a remote mobile device. The system may determine the location of the remote mobile device using an intermediate device. Specifically, a position of the intermediate device relative to the system node is calculated, and a position of the remote mobile device relative to the intermediate device is calculated. The two positions may be combined to determine a position of the remote mobile device relative to the system node. Once the location of the remote mobile device is known relative to the system node, a variety of location-based services becomes available.

Figure 1:
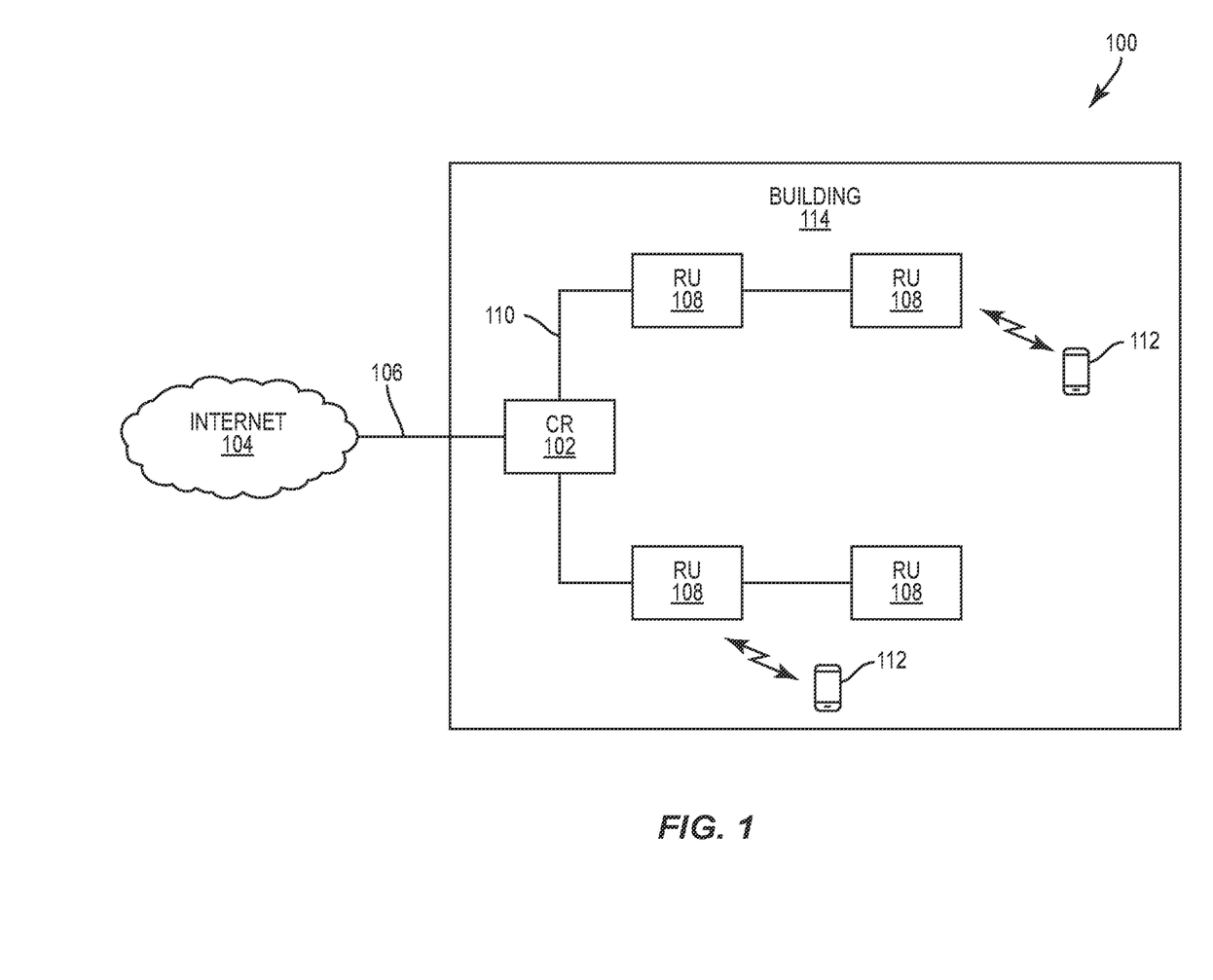
FIG. 1 is a stylized block diagram of a location system in a building and coupled to an external network.
Figure 2:
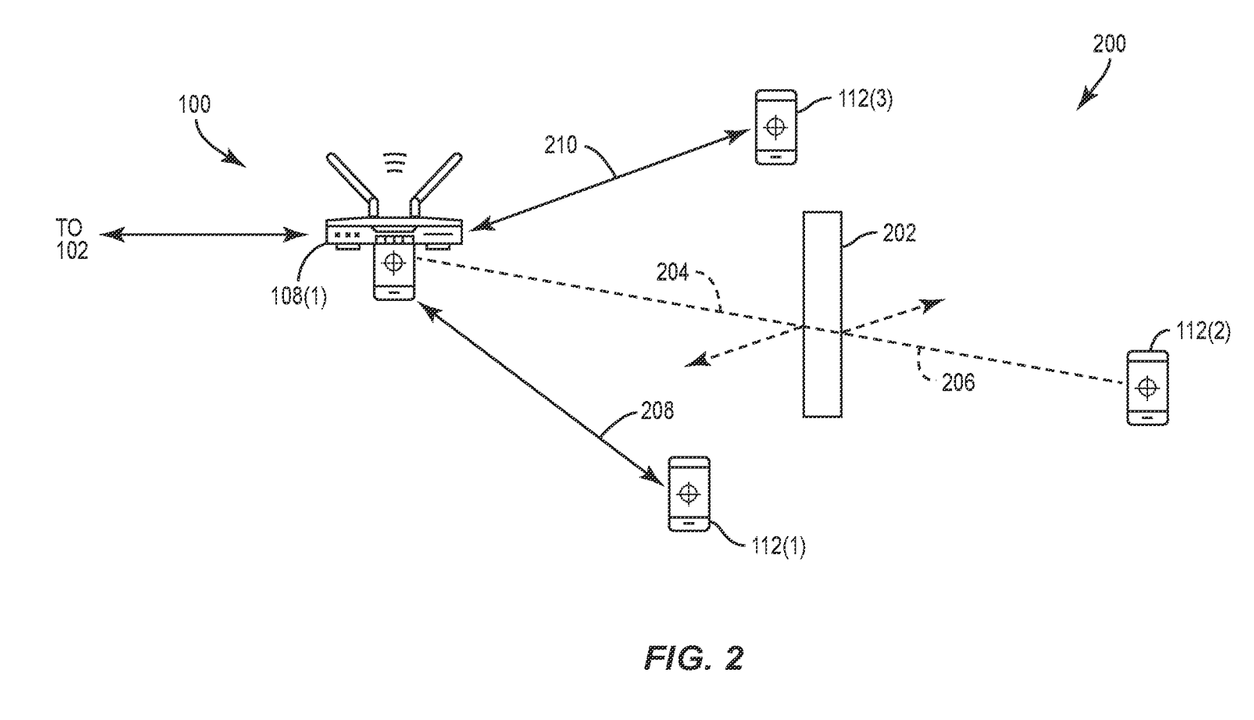
FIG. 2 is a stylized block diagram of a portion of the location system of FIG. 1 with physical barriers that may preclude ready location of one or more devices.

Before addressing exemplary aspects of the present disclosure, a brief discussion of exemplary location systems and their limitations is provided with reference to FIGS. 1 and 2. Discussion of exemplary aspects of the present disclosure begins below with reference to FIG. 3.

Location systems, such as location system 100 illustrated in FIG. 1, come in a variety of shapes and sizes, but commonly have a central router 102 that may be connected to the Internet or cloud 104 through a physical or wireless connection 106 (e.g., a modem with an optical fiber or dedicated microwave relay connecting to a central office of a service provider). The central router 102 may also be referred to as a head end unit, central unit, anchor unit, or the like. The central router 102 may be coupled to one or more remote units 108 through a physical connection 110. The remote units 108 include transceiver circuitry (not shown) to send and receive signals to mobile devices 112 (sometimes called "tags" in the industry, particularly when used for inventory purposes). Power may be supplied to the remote units 108 locally or through the physical connection 110. The physical connection 110 may be a copper or aluminum conductor, a fiber optic cable, or the like. As needed, electro-to-optical converters and optical-to-electro converters may be used to change a signal medium. In most instances, an effort is made to place enough remote units 108 throughout a building 114 so that, regardless of position, the mobile devices 112 have a line of sight and/or line of effect to at least one remote unit 108. In this regard, the remote units 108 may also be considered anchor units.

The location system 100 might be installed for a variety of reasons or merely piggyback on a communication system (not shown explicitly but having a structure similar to the location system 100). Exemplary location systems 100 may be used to track inventory as it moves around the building 114; provide E911 emergency services; provide mapping services in a large building such as a shopping mall or airport; provide environmental controls (e.g., lighting or heating/air conditioning) based on a detected location (e.g., automatically turn on lights when a mobile device enters a room); or the like.

When the location system 100 used early generation wireless technologies, it was relatively easy to place a modest number of remote units 108 throughout the building 114 to achieve adequate coverage without driving up expense to unacceptable levels. However, more recent wireless technologies such as ultra-wideband (UWB) operate in higher frequencies such as the sixty gigahertz (60 GHz) range. These higher frequencies experience comparatively greater atmospheric losses and may be completely blocked by walls of the building as better shown by FIG. 2.

In this regard, FIG. 2 illustrates a portion 200 of the location system 100 of FIG. 1 where mobile devices 112(1) and 112(3) are within communication range (which may, for example, be limited by line of sight) with a remote unit 108(1), but mobile device 112(2) is blocked by a wall 202, causing signals 204 and 206 to bounce or otherwise not propagate through the wall 202. In contrast, the mobile devices 112(1), 112(3) have signal paths 208, 210 that allow communication to pass between the mobile devices 112(1), 112(3) and the remote unit 108(1). The inability to track the mobile device 112(2) poses an impediment to providing location-based services, which may impair the user experience, result in improper inventory management, or the like.

Figure 3:
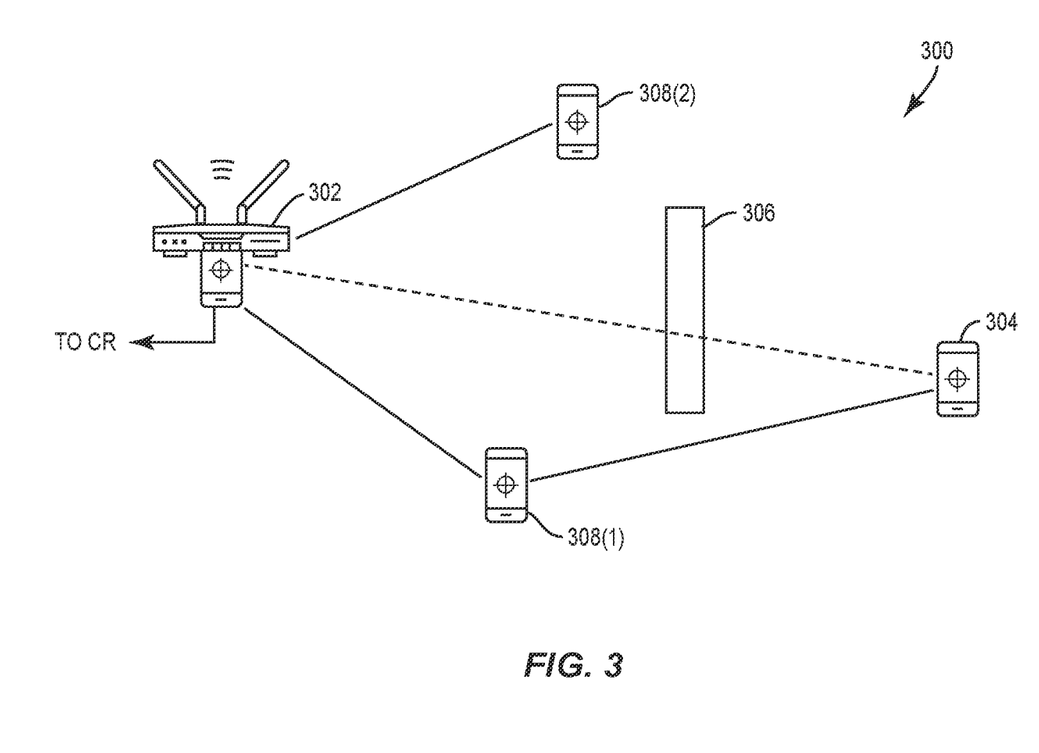
FIG. 3 is a stylized block diagram of an exemplary location system that uses an intermediate mobile device to assist in locating a remote mobile device.

Exemplary aspects of the present disclosure allow for location of a mobile device using an intermediate mobile device as illustrated in FIG. 3 by system 300. Specifically, using exemplary aspects of the present disclosure, a fixed anchor unit 302 (also referred to as a system node and which may be functionally similar to the central unit 102 or a remote unit 108) may locate a remote mobile device 304 that may be out of communication range to the anchor unit 302, such as out of line of sight such as behind a wall 306, by using one or more intermediate mobile devices 308(1)-308(2). While it is specifically contemplated that the intermediate device used by the present disclosure is mobile, there are aspects where the intermediate device is not mobile and may be part of the infrastructure, but without knowing its own location (e.g., a dumb repeater with no location information available)

Specifically, the location of the intermediate mobile devices 308(1)-308(2) relative to the anchor unit 302 may be ascertained. Such relative location information may include distance and angle of arrival (AoA) information. From this relative position and the known location of the anchor unit 302, an absolute position or location of the intermediate mobile devices 308(1)-308(2) may be determined.

Likewise, the location of the remote mobile device 304 relative to the intermediate mobile devices 308(1)-308(2) may be ascertained. In effect, the intermediate mobile devices 308(1)-308(2) act to form a sort of mesh network. Such relative location information may include distance and AoA information. From this relative position and the known location of the intermediate mobile devices 308(1)-308(2), an absolute position or location of the remote mobile device 304 may be determined.

This relative information may be calculated by the remote mobile device 304, the intermediate mobile devices 308(1)-308(2), or the anchor unit 302 based on a received signal strength indicator (RSSI) measurement (to calculate distance) and by differences in signal strength detected by diversity antennas, differences in phase of detected signals, an accelerometer, a gyroscope, or other calculation performed to manage beamforming. This approach may rely on UWB, WIFI, or the like. Another option includes the use of BLUETOOTH Low Energy (BLUETOOTH LE) Distance Measurements (DM). As another alternative, the raw information may be passed to a remote computing device (e.g., in the Internet or through a cloud-based service access through the Internet or other network) which performs the calculations to determine a relative position.

Note that the anchor unit 302 may communicate with the intermediate mobile devices 308(1)-308(2) using a variety of wireless standards such as BLUETOOTH LE, UWB, WIFI, or the like. Similarly, the remote mobile device 304 may communicate with the intermediate mobile devices 308(1)-308(2) using the same wireless standard or a different wireless standard. For example, one leg could be BLUETOOTH LE and the other leg UWB. The location information may be exchanged in band or out of band.

Note that only one of the intermediate mobile devices 308(1)-308(2) is required to find the location of the remote mobile device 304, but with multiple paths (e.g., two or more intermediate mobile devices) used, the location may be more precisely determined or, if preferred, the intermediate mobile device 308(1)-308(2) with the strongest RSSI may be used. In addition to distance and AoA information, other UWB data, like figure of merit (FoM), can be calculated.

By using the intermediate mobile devices 308(1)-308(2) to assist in creation of a mesh network in this fashion, the number of fixed remote units/anchor units may be kept to commercially reasonable numbers. Likewise, by identifying a location for the remote mobile device 304, location-based services may be provided. Note also, that while only one step is shown (i.e., anchor-intermediate-remote), more intermediate steps may be present without departing from the present disclosure (e.g., anchor-intermediate one-intermediate two-intermediate three-remote).

Figure 4:
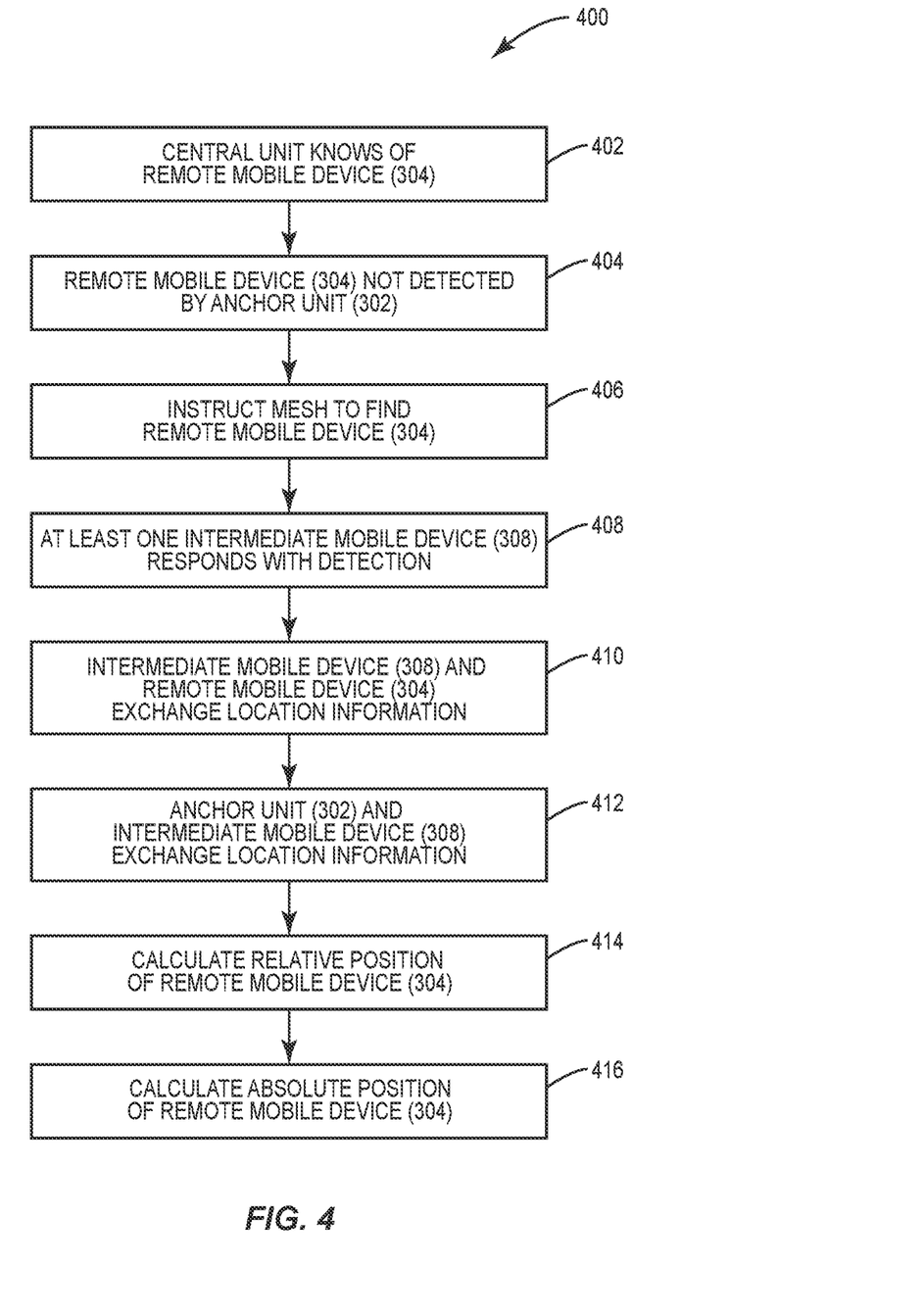
FIG. 4 is a flowchart illustrating an exemplary process showing how the position of the remote mobile device is calculated using an intermediate mobile device.

A process 400 for finding the remote mobile device 304 is provided with reference to FIG. 4. The process 400 begins with the central unit knowing the existence of the remote mobile device 304 (block 402), such as by existence of a line item on a routing table. At some point, the remote mobile device 304 is not detected by any anchor unit 302 (block 404). Again, the anchor units 302 may be the central unit or remote units. The failure to detect may be at system start or because the remote mobile device 304 has moved out of range of all anchor units 302. The central unit may instruct the mesh to "find" the remote mobile device 304 (block 406). This initial finding of the remote mobile device 304 may just be existence and/or proximity detection such as through a ping command and received response (e.g., a command for all receiving devices to return a response indicating receipt of the command; this command and response may be in band or out of band). At least one intermediate mobile device 308 in the mesh responds with an indication of detection (block 408). For example, either or both intermediate mobile devices 308(1)-308(2) detect the remote mobile device 304.

The intermediate mobile device 308 and the remote mobile device 304 exchange location information (block 410) to determine relative positions to one another. If there is more than one serially-positioned intermediate mobile device 308, this may be repeated as needed. Likewise, the anchor unit 302 and the intermediate mobile device 308 exchange location information (block 412). Note that as the degree of separation increases, the calculations may become more complex and may rely on a confidence value such as a Figure of Merit (FoM).

Using basic trigonometric functions, an entity may calculate the relative position of the remote mobile device 304 (block 414) and from that may calculate the absolute position of the remote mobile device 304 (block 416).

Figure 5:
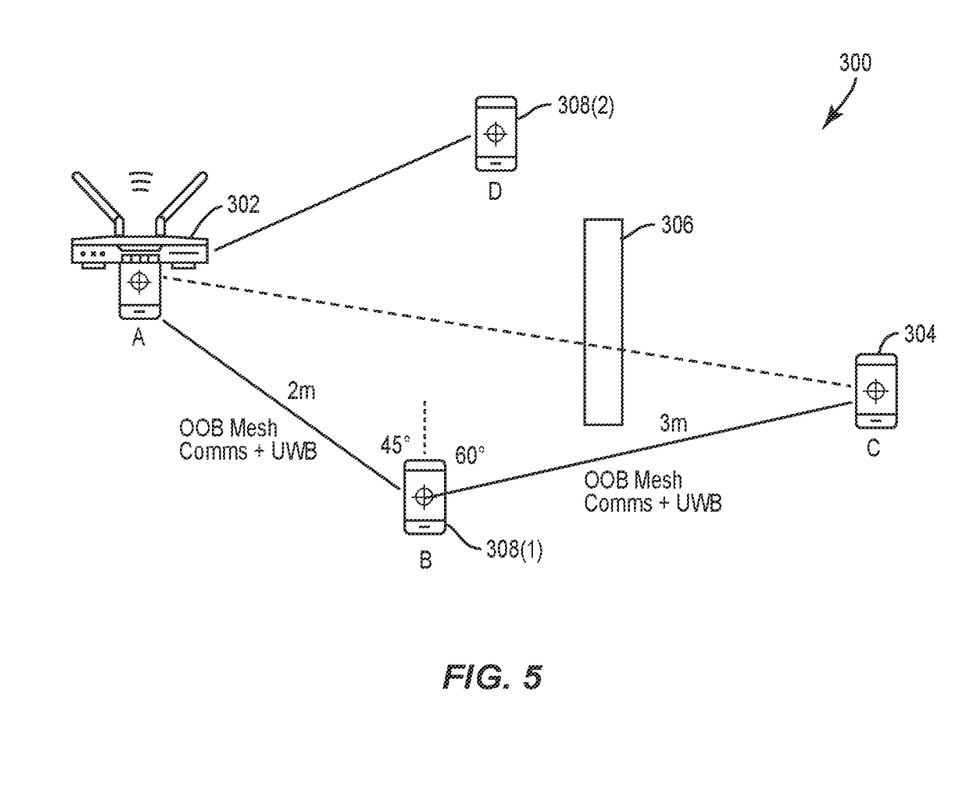
FIG. 5 is a stylized block diagram of the location system of FIG. 3 with exemplary numbers used to illustrate calculations used to locate the remote mobile device.

By way of example, FIG. 5 duplicates the system 300 with some additional angle and distance measurements provided. The remote mobile device 304 is three meters (3 m) from the intermediate mobile device 308(1) and the AoA is 60 degrees. Likewise, the intermediate mobile device 308(1) is 2 m from the anchor unit 302 and the AoA is 45 degrees. This creates a triangle ABC, and the angle at vertex B is 105 degrees (45+60). Using the law of cosines, a distance AC may be calculated as follows:

$$AC^2 = AB^2 + BC^2 - 2(AB)(BC)\cos(<B)$$

Substituting in the known values:

$$AC^2 = 2^2 + 3^2 - 2(2)(3)\cos 105° \text{ or}$$

$$AC = 4.013 \text{ m}$$

Angles AC and BC can be calculated using other trigonometric functions. It should be appreciated that at least initially, the location is determined relative to an anchor unit. When the absolute position of the anchor unit is known, the absolute position of the mobile device may likewise be determined. This location may be in all three axes (longitude, latitude, height/x,y,z). Further, this location information may accumulate over time to have a log of historic positions as well as potentially be extrapolated for predictive location determinations.

Note that errors may accumulate in large networks with many serially-positioned intermediate mobile devices in the mesh. This accumulation of errors may make the final estimate unusable. This accumulation of errors may be reduced by using multiple paths (e.g., redundancies) to connect between multiple points through averaging of the redundant legs. A mean square error between ranging and AoA can be used and optimized based on what should be the observed values given an estimation of the positions. A loop closure from a simultaneous localization and mapping (SLAM) algorithm may be used. Still other algorithms and estimates may be used to reduce the possibility of error accumulation.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A method of locating a remote mobile device, comprising:
    using an intermediate device from amongst a plurality of devices based on a received signal strength indicator (RSSI);
    receiving first location information about the intermediate mobile device relative to an anchor unit, wherein the first location information comprises first angle of arrival (AoA) information and first distance information;
    receiving second location information about a remote mobile device relative to the intermediate mobile device; and
    calculating an absolute position of the remote mobile device based on the first location information and the second location information.

2. The method of claim 1, wherein the second location information comprises second AoA information and second distance information.

3. The method of claim 1, wherein calculating comprises calculating at the anchor unit.

4. The method of claim 1, wherein calculating comprises calculating at a central unit.

5. The method of claim 1, wherein calculating comprises calculating at the remote mobile device.

6. The method of claim 1, wherein calculating comprises calculating on a computing device associated with a cloud computing system.

7. The method of claim 1, further comprising detecting the remote mobile device with one of a plurality of intermediate mobile devices.

8. The method of claim 1, further comprising averaging a plurality of calculations when calculating to reduce errors.

9. The method of claim 1, wherein receiving the first location information comprises receiving the first location information using a first wireless standard and receiving the second location information comprises receiving the second location information using a second wireless standard different than the first wireless standard.

10. The method of claim 9, wherein one of the first wireless standard and the second wireless standard comprises an ultrawideband (UWB) standard.

11. The method of claim 1, wherein receiving the first location information comprises receiving the first location information using a first wireless standard and receiving the second location information comprises receiving the second location information using the same first wireless standard.

12. The method of claim 1, wherein receiving the second location information comprises receiving the second location information at the anchor unit through a plurality of intermediate mobile devices.

13. A location system comprising:
    an anchor unit with a fixed first location;
    a remote mobile device configured to operate outside a range of the anchor unit; and
    a plurality of devices, wherein the plurality of devices comprises an intermediate mobile device having a strongest received signals strength indicator (RSSI) and the intermediate device configured to provide first relative position information including first angle of arrival (AoA) and first distance information relating to the remote mobile device to the anchor unit and determine second relative position information relating to the anchor unit;
    a calculation unit configured to use the first relative position information and the second relative position information to determine a position of the remote mobile device relative to the anchor unit.

14. The location system of claim 13, wherein the anchor unit is configured to communicate with the intermediate mobile device using an ultrawideband (UWB) protocol.

15. The location system of claim 13, wherein the anchor unit is configured to determine the position of the remote mobile device.

16. The location system of claim 13, further comprising a central unit communicatively coupled to the anchor unit, wherein the central unit is configured to be the calculation unit.

17. The location system of claim 13, wherein the intermediate mobile device is configured to be the calculation unit.

* * * * *